(12) United States Patent
Bog et al.

(10) Patent No.: US 7,443,840 B2
(45) Date of Patent: Oct. 28, 2008

(54) TELECOMMUNICATIONS DEVICE FOR USE BETWEEN ANALOG TELEPHONES AND A PACKET NETWORK

(75) Inventors: Abdullah Murat Bog, Milpitas, CA (US); Steven Turner, Overland Park, KS (US); Matthew Kung-Wei Jonathan Barrow, Kansas City, MO (US); Tracey Mark Bernath, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 657 days.

(21) Appl. No.: 11/060,235

(22) Filed: Feb. 17, 2005

(65) Prior Publication Data
US 2005/0141489 A1    Jun. 30, 2005

Related U.S. Application Data

(63) Continuation of application No. 09/803,842, filed on Mar. 12, 2001, now Pat. No. 6,870,832, which is a continuation of application No. 09/128,944, filed on Aug. 5, 1998, now Pat. No. 6,229,803.

(51) Int. Cl.
*H04L 12/66* (2006.01)
(52) U.S. Cl. .................................... 370/352; 370/401
(58) Field of Classification Search ......... 370/351–358, 370/401, 402, 389, 377, 462
See application file for complete search history.

(56) References Cited

U.S. PATENT DOCUMENTS

| 4,879,738 A | | 11/1989 | Petro |
| 5,428,608 A | * | 6/1995 | Freeman et al. ............. 370/261 |
| 5,598,401 A | * | 1/1997 | Blackwell et al. ........... 370/385 |
| 5,790,174 A | * | 8/1998 | Richard et al. ................ 725/99 |
| 5,862,203 A | | 1/1999 | Wulkan et al. |
| 5,974,237 A | | 10/1999 | Shurmer et al. |
| 6,081,525 A | | 6/2000 | Christie et al. |
| 6,141,339 A | | 10/2000 | Kaplan et al. |

* cited by examiner

*Primary Examiner*—Brenda Pham

(57) ABSTRACT

A communication device is coupled to a packet network and includes two ports coupled to two analog telephones. The communication device receives a message from the packet network indicating a called number and processes the called number to select one of the ports and to transfer a ring signal through the selected port to ring the analog telephone. The communication device transfers a message to the packet network indicating that a called party is being alerted, detects an off-hook condition for the analog telephone and stops the transfer of the ring signal, transfers a message to the packet network indicating packet routing information for the communication session, exchanges analog voice signals with the analog telephone through the selected port, exchanges voice packets with the packet network using the packet routing information, and interworks between the analog voice signals and the voice packets.

20 Claims, 7 Drawing Sheets

TELECOMMUNICATIONS DEVICE FOR USE BETWEEN ANALOG TELEPHONES AND A PACKET NETWORK

RELATED APPLICATIONS

This patent application is a continuation of patent application Ser. No. 09/803,842; filed Mar. 12, 2001; entitled "Telecommunications Provider Agent" which is a continuation of U.S. Pat. No. 6,229,803; filed Aug. 5, 1998; entitled "Telecommunications Provider Agent" and which is hereby incorporated by reference into this patent application.

FIELD OF THE INVENTION

The invention is related to the field of telecommunications, and in particular, to a communication device that is utilized between analog telephones and a packet network.

BACKGROUND

Advanced communications networks are being developed to support a vast array of communications services. These networks are controlled by complex hardware and software platforms referred to as session managers. Users requiring communications sessions from these advanced networks must interface with the session managers to request and receive communications services. Session managers operate using various messages, such as invite messages, reply messages, confirm messages, join messages, and terminate messages.

A class 5 telephone switch communicates with an analog telephone using the analog telephony signals in the well-known analog telephony format. The class 5 telephone switch provides power to the telephone. The class 5 telephone switch detects off-hook current caused by the telephone and provides the telephone with dial tone. The caller generates Dual-Tone Multi-Frequency (DTMF) signals. The class 5 telephone switch detects the DTMF signals and initiates the call in the network. When the far-end telephone is ringing, the class 5 telephone switch plays a ringback tone to the caller. If the far-end telephone is busy, the class 5 telephone switch plays a busy tone to the caller. On incoming calls, the class 5 telephone switch provides ring current to the telephone.

Telephony cards are being developed to manage multiple telephones in the home. The telephony cards are typically plugged into communications hubs or computers in the residence, and telephones are connected to the telephony card. The telephony cards connect these telephones in the home to a network element in the advanced communications network. This connection between the telephony card and the network element is much different than the traditional analog line to the local switch. This connection is typically an Asynchronous Transfer Mode (ATM) connection to an ATM device. ATM signals do not traditionally support analog telephony signals, such as off-hook, dial tone, and busy signals. The telephony cards detect off-hook conditions, on-hook conditions, and digits. In addition, the telephony cards provide the telephones with dial tone, ring current, ringback, and busy signals.

At present, there is not an acceptable software interface method or product for use between the telephony card and the session manager in the network. There is a need for software that can provide an interface between the telephony card and the session manager.

SUMMARY

Some examples of the invention include a communication device that is coupled to a packet network and that includes at least two ports respectively coupled to at least two analog telephones. The communication device receives a first message from the packet network indicating a called number and responsively processes the called number to select one of the ports coupled to one of the analog telephones. The communication device transfers a ring signal through the selected port to ring the one analog telephone. The communication device transfers a second message to the packet network indicating that a called party associated with the called number is being alerted responsive to transferring the ring signal. The communication device detects an off-hook condition for the one analog telephone and responsively stops the transfer of the ring signal. The communication device transfers a third message to the packet network indicating packet routing information for the communication session. The communication device exchanges analog voice signals with the one analog telephone through the selected port and exchanges voice packets with the packet network using the packet routing information. The communication device interworks between the analog voice signals and the voice packets.

DETAILED DESCRIPTION

Figure 1:
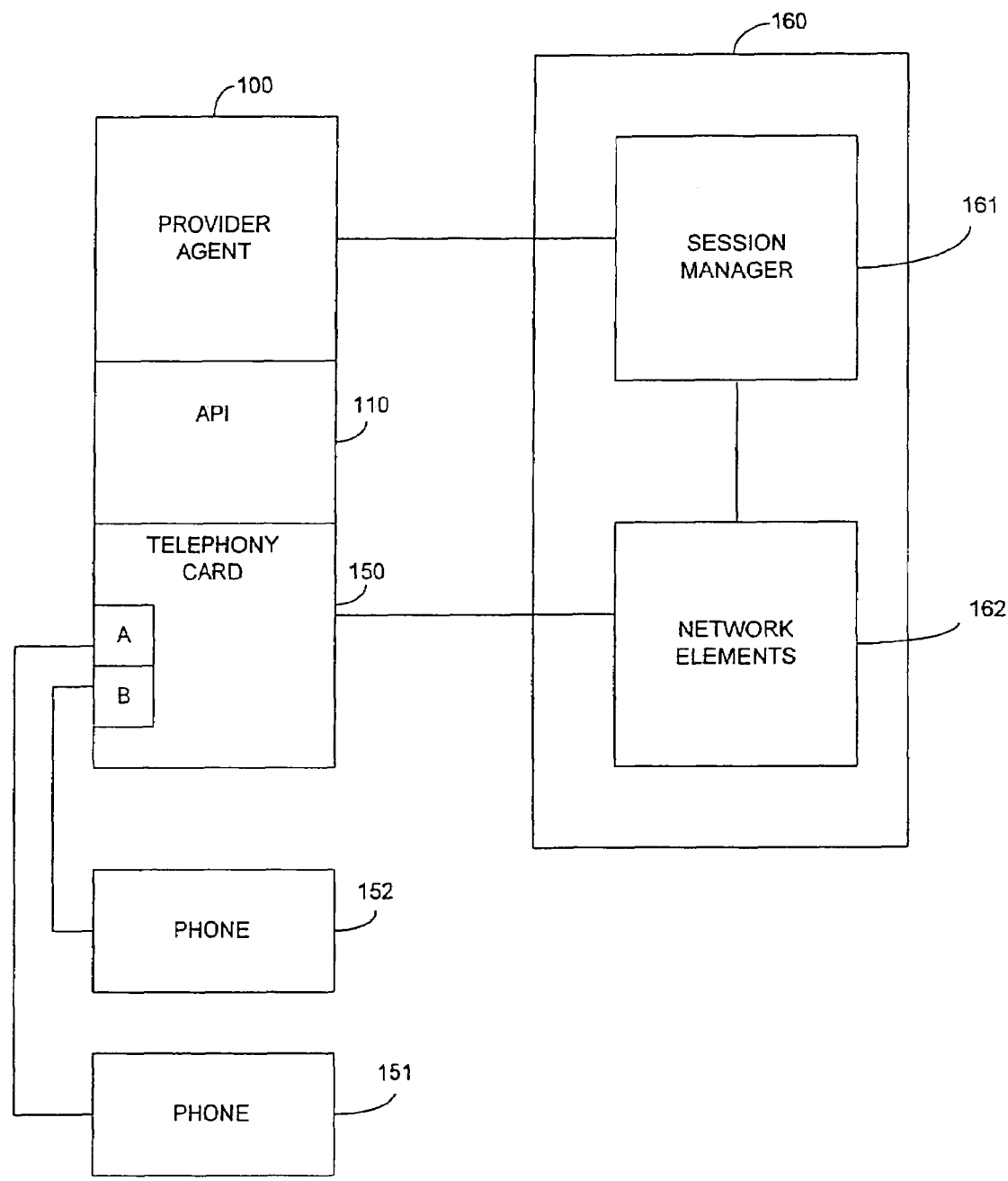
FIG. 1 is a block diagram of a system architecture in some examples of the invention.

System Architecture-FIG. 1

FIG. 1 depicts one example of a system architecture in block diagram form. A provider agent 100 is coupled to an Application Programming Interface (API) 110. The API 110 is coupled to a telephony card 150. The telephony card 150 is connected to phones 151-152 over channels A and B respectively. The provider agent 100 is coupled with a session manager 161 in a network 160. The telephony card 150 is connected to network elements 162 in the network 160.

The network 160 is comprised of network elements 162 that provide digital communications services to the telephony card 150. Some examples of network elements 162 are ATM switches and multiplexers, Digital Subscriber Line (DSL) equipment, Internet Protocol (IP) routers and servers, and enhanced services platforms. The session manager 161 controls the set-up and delivery of communications services in the network 160. The session manager 161 receives user service requests and invokes the desired services through network elements 162.

Version 0.8 of the "Retailer Reference Point Specification" issued by the Telecommunication Information Network Architecture Consortium (TINA-C) specifies the session manager 161 and the connection and messaging between the session manager 161 and the provider agent 100. The interface between the session manager 161 and the provider agent 100 is compiled into CORBA IDL. The interface transport is via Transaction Control Protocol/Internet Protocol (TCP/IP) using Logic Link Control/Sub-Network Access Protocol (LLC/SNAP) encapsulation and ATM Adaptation Layer 5 (AAL5) to provide Permanent Virtual Connection (PVC) connectivity.

The telephony card 150 includes channels for the phones 151-152 and an interface to the network 160. In some embodiments of the invention, the channels to the phones 151-152 are conventional telephone ports, and the interface to the network 160 is an ADSL/ATM port. The telephony card 150 includes circuitry to interwork analog telephony signals from the phones 151-152 with the digital signals to the network 160. One example of such a digital signal is an ADSL/ATM signal. The telephony card 150 includes circuitry that generates dial tones, ring-back tones, busy tones, fast-busy tones, and ring current for the phones 150-151. The telephony card 150 includes circuitry that detects Dual Tone Multi-Frequency (DTMF) digit events, off-hook events, and on-hook events, and that provides messages indicating these events. The telephony card 150 also includes software control systems that control the circuitry and interface with the API 110. One example of the telephony card 150 is the telephony card product provided by InnoMedia Logic (IML) of Quebec, Canada.

The phones 151-152 represent any communications devices supported by the telephony card 150. Some examples are conventional analog telephones, wireless phones, computers, modems, and fax machines. Additional phones could be connected to channels A and B, or additional phones could be connected to additional channels on the telephony card 150. Only two channels with one phone each is shown for the sake of clarity.

Those skilled in the art are familiar with the telephony card 150 and the network 160. A description of these elements is found in co-pending U.S. patent application Ser. No. 08/826,641, entitled "Telecommunications System", filed on Apr. 7, 1997, assigned to the same entity as this patent application, and that is hereby incorporated by reference into this patent application. A description of these elements is found in co-pending U.S. patent application entitled "Asynchronous Transfer Mode System for Providing Telephony Service", 09/129248, filed on the same date as this patent application, assigned to the same entity as this patent application, and that is hereby incorporated by reference into this patent application.

The API 110 is a software interface that exchanges event messages and instructions between the telephony card 150 and the provider agent 100. The provider agent 100 accepts event messages from the telephony card 150 through the API 110 and provides instructions back to the telephony card 150. For example, the provider agent 100 might receive information through the API 110 that the phone 151 has gone off-hook. In response, the provider agent 100 might provide a control instruction through the API 110 to the telephony card 150 to provide dial tone to the phone 151. In some embodiments of the invention, the API 110 is specified in CORBA IDL.

The provider agent 100 responds to event messages for the phones 151-152 with instructions for the telephony card 150 to interact with the user. User interaction includes dial tone, digit collection, ring, ringback, and busy signals. The provider agent 100 also exchanges messaging with the session manager 161. Messages include invite messages, reply messages, join messages, confirm messages, and terminate messages.

Both the provider agent 100 and the API 110 are comprised of software that is stored on a software storage medium. Examples of a software storage medium include magnetic disks, optical disks, or integrated circuits. The provider agent 100 and the API 110 could also be stored on a server and down-loaded to a user over the Internet or another operational connection. Both the provider agent 100 and the API 110 are executed by a microprocessor system. The microprocessor system could be comprised of a single microprocessor or a configuration of related microprocessors. The microprocessor system could be housed in many devices with a few examples being a residential communications hub, a computer, or the telephony card 150. In some embodiments of the invention, the provider agent is comprised of objects written in C++ code.

Figure 2:
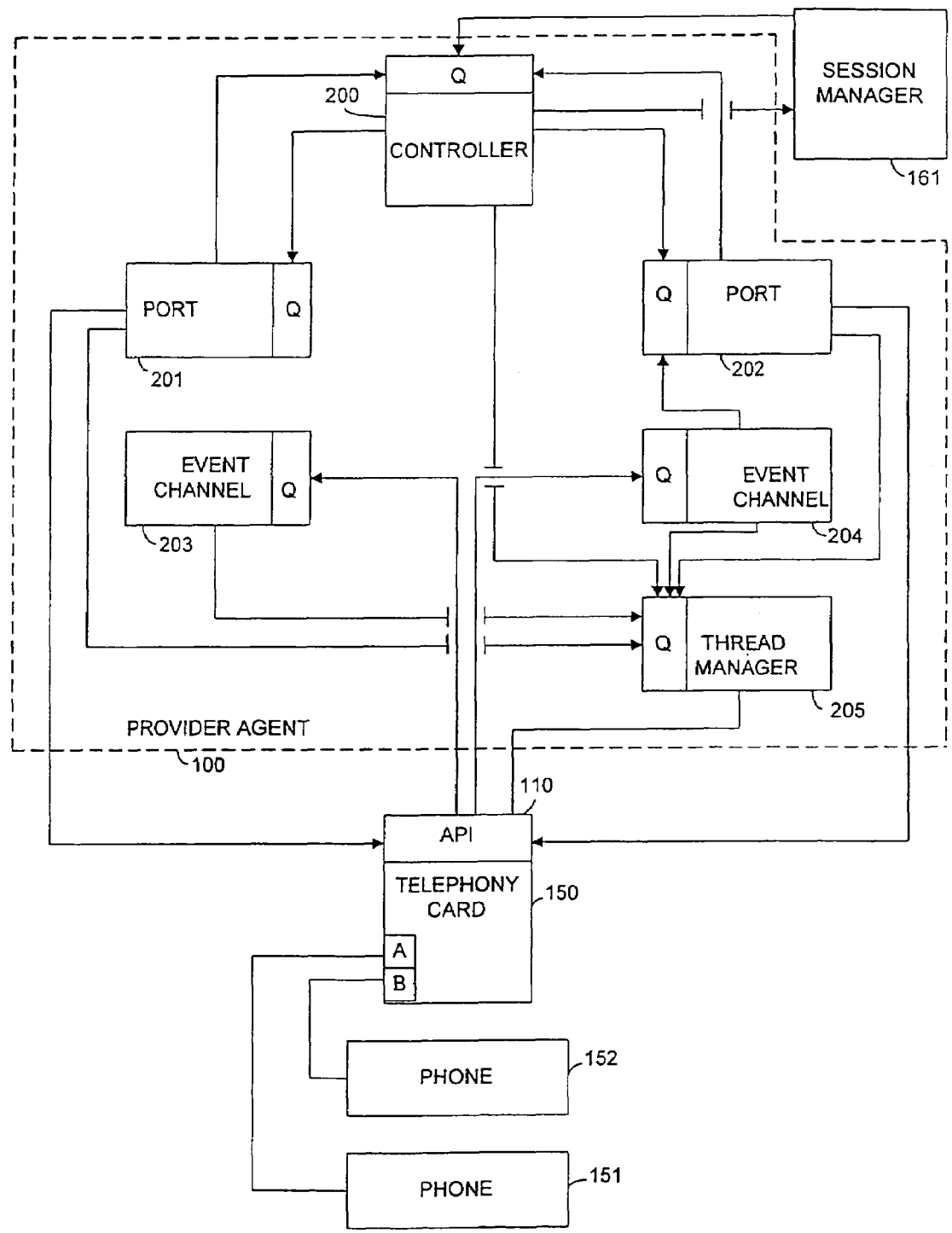
FIG. 2 is a block diagram of a software architecture in some examples of the invention.
Figure 3:
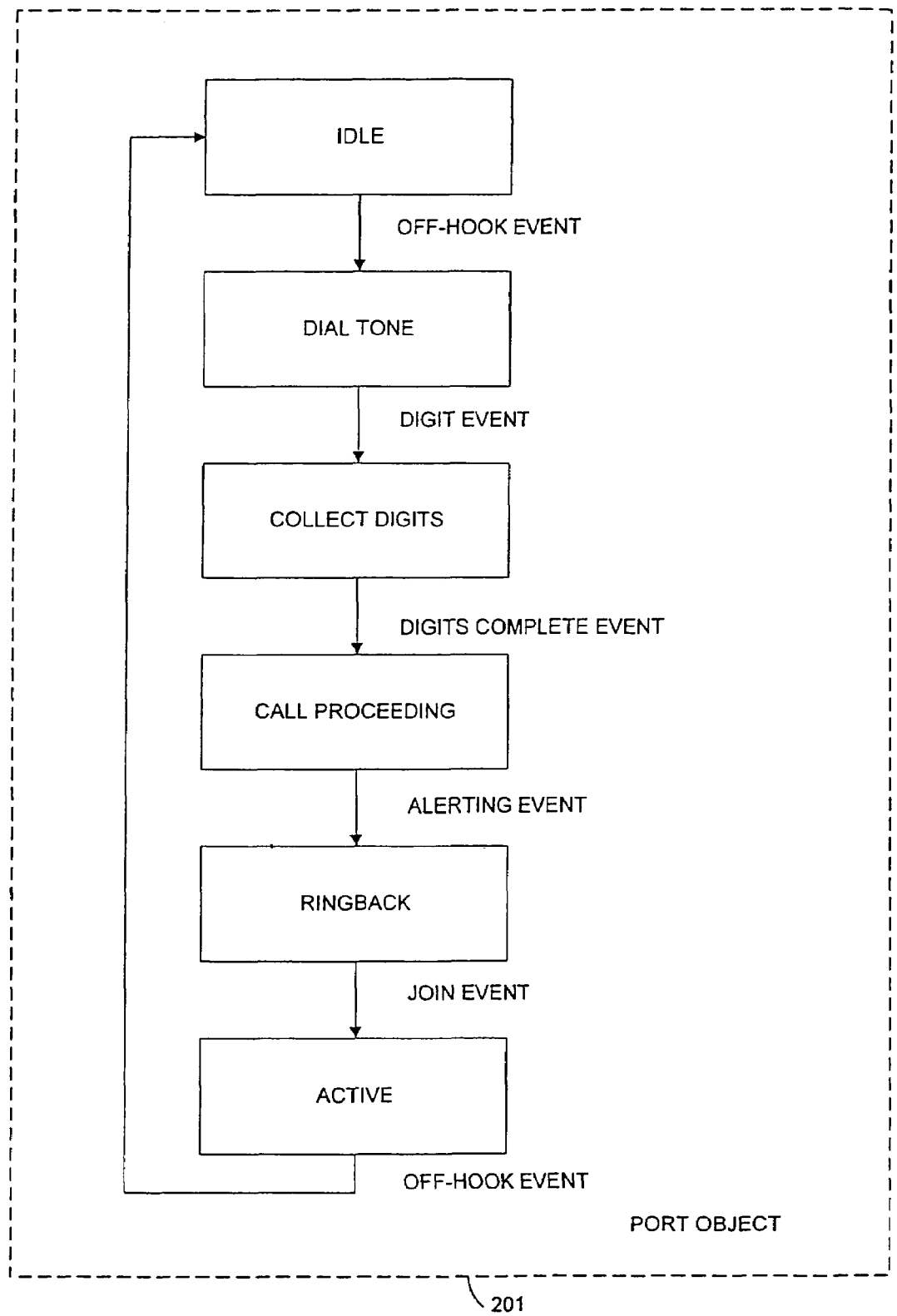
FIG. 3 is a port object state machine diagram for some examples of the invention.

Software Architecture-FIGS. 2-3

FIG. 2 depicts one example of a software architecture for the provider agent 100. The provider agent 100, the API 110, the telephony card 150, the phones 151-152, and session manager 161 are shown as in FIG. 1 and operate as discussed above. The provider agent 100 is comprised of the following software objects: a controller object 200, port objects 201-202, event objects 203-204, and a thread manager object 205. The port object 201 and the event object 203 are associated with channel A. The port object 202 and the event object 204 are associated with channel B. The software objects 200-205 are executed by a multi-threaded processing system with each object having its own thread. Each object also has a queue that is indicated on FIG. 2 by the letter "Q". The queue is the software component that receives and buffers messages for the object.

The controller object 200 communicates with the session manager 161 and the port objects 201-202. Communications with the session manager 161 are comprised of the following messages:

Start Service—a message to the session manager that initially identifies the service requested and includes an access key, a service ID, and user information.

Reference Information—a message from the session manager that includes session ID, party ID, and a secret ID.

Invite—a message that requests a telephony session and includes the dialed number(s).

Reply—a message that responds to an Invite message and indicates alerting, busy, or reject.

Join—a message that indicates that the party is ready to join the session.

Add Stream—a message to the session manager that requests a connection to be established to another party and that includes the terminal ID, the Party ID and the Virtual Path (VP)/Virtual Connection (VC).

Join Stream—a message from the session manager that requests a party to attach to a connection from another party.

Confirm—a message that is sent or received by the provider agent and that indicates that an ATM network connection has been made.

Terminate—a message that is sent or received by the provider agent and that indicates that the session is over.

The controller object 200 encapsulates call related information by generating call record objects that are identified by session ID and channel ID. The controller object 200 stores data indicating the idle or busy status of each channel. The controller object 200 includes an internal data structure for any desired call-handling policies. Call handling policies include rules for call waiting, voice mail, call blocking, and the internal routing of incoming calls to particular phones, such as idle phones. These policies can be varied based on the caller's number, the time of day, or other factors.

The port objects 201-202 are state machines. FIG. 3 depicts one example of a state machine for the port object 201 in block diagram form. The initial state is Idle. An off-hook event for channel A moves the port object 201 to the dial tone state and an instruction to provide dial tone is provided to the telephony card 150. A digit event for channel A moves the port object 201 to the collect digits state and an instruction to stop dial tone is provided to the telephony card 150. The port object 201 creates a digit collection object. Digits that are collected by the telephony card 150 are provided to the digit collection object for analysis. The digit collection object determines the type of number dialed, such as emergency numbers, seven-digit numbers, ten-digit numbers, and international numbers. The digit collection object instructs the port object 201 when digit collection is complete. A digits complete event for channel A moves the port object 201 to the call proceeding state and the port object 201 instructs the controller object 200 to send Start Service and Invite messages to the session manager 161. An alerting indication from the controller object 200 moves the port object 201 to the ringback state where a ringback instruction is provided to the telephony card. The alerting event is based on a reply message from the session manager 161. A join event from the controller object 200 moves the port object 201 to the active state where the session is conducted. The join event is based on a join message from the session manager 161. An on-hook event for channel A moves the port object 201 back to the idle state and results in a termination message being sent by the controller object 200 to the session manager 161.

A few deviations from the above-described state machine should be appreciated. If the reply message had a busy indication, a busy state would be entered instead of the ringback state, and a busy tone instruction would be provided to the telephony card 150. If the reply message had a reject indication, a fast-busy state would be entered instead of the ringback state and a fast-busy tone instruction would be provided to the telephony card 150. In both of the above cases, an on-hook event moves the port object 201 back to the idle state.

When receiving a call, the state machine is much simpler. In the idle state, an invite indication from the controller object 200 moves the port object 201 to the ring state where the telephony card is instructed to ring channel A. The invite indication is based on an invite message from the session manager 161. An off-hook event for channel A moves the port object 201 to that active state, until an on-hook event moves the port object 201 back to the idle state.

Referring back to FIG. 2, the event objects 203-204 track the events for each respective channel and indicate the events to the respective port objects 201-202. The event object 203 can process events using a different thread than the port object 201, and the event object 204 can process events using a different thread than the port object 202. Multi-threaded processing in this manner has advantages. Multi-threading simplifies system design and is more efficient than a single-threaded system. Multi-threading allows multiple threads to be processed in various states at the same time without the entire system waiting for a single input.

The API 110 utilizes a messaging format comprised of an instruction followed by variables in parentheses. The primary instructions are:

start ring (channel ID)
stop ring (channel ID)
start tone (channel ID, tone type)
stop tone (channel ID, tone type)
wait event (channel ID, event type)
event (channel ID, event type, value)
open voice channel (channel ID, VPI/VCI)
close voice channel (channel ID, VPI/VCI)

In the above messages, the channel ID identifies the relevant channel of the telephony card 150. The tone types are dial tone, ringback, busy, and fast-busy. The event types are off-hook, on-hook, and digit. The value is the value of the digit. The VPI/VCI identifies the Virtual Path and Virtual Channel used by the telephony card 150 for the session.

The thread manager object 205 provides fault tolerance for software failures and certain hardware failures. The thread manager object 205 continuously receives heartbeat messages from the objects 200-204. If a heartbeat message is not received as expected, the thread manager object 205 identifies and attempts to restart the affected thread. If the heartbeat is still absent, the thread manager object 205 instructs the telephony card 150 to use conventional fail-over analog telephone service for the channel with the malfunctioning thread.

Figure 4:
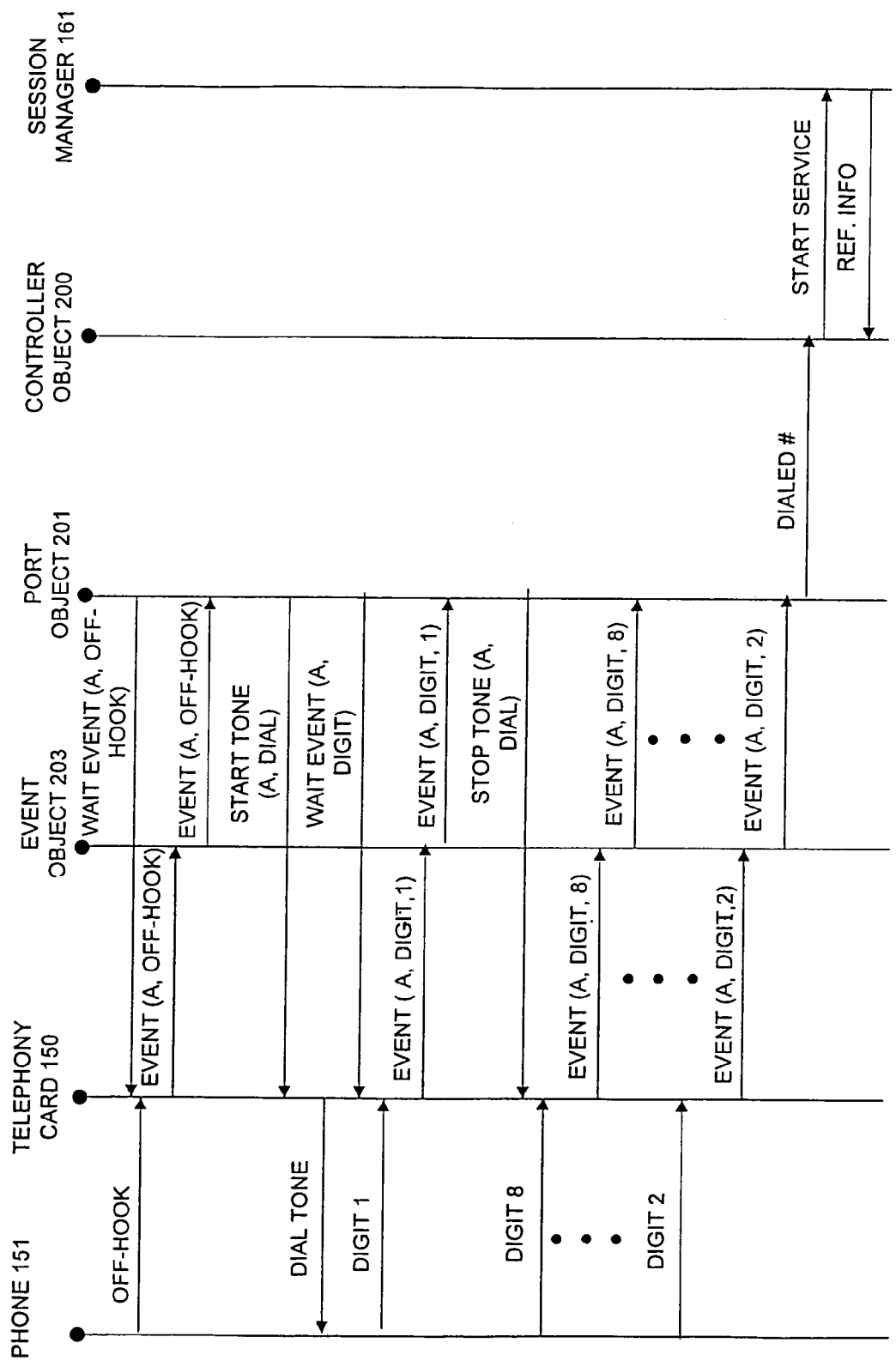
FIGS. 4-6 are message sequence charts for some examples of the invention.
Figure 5:
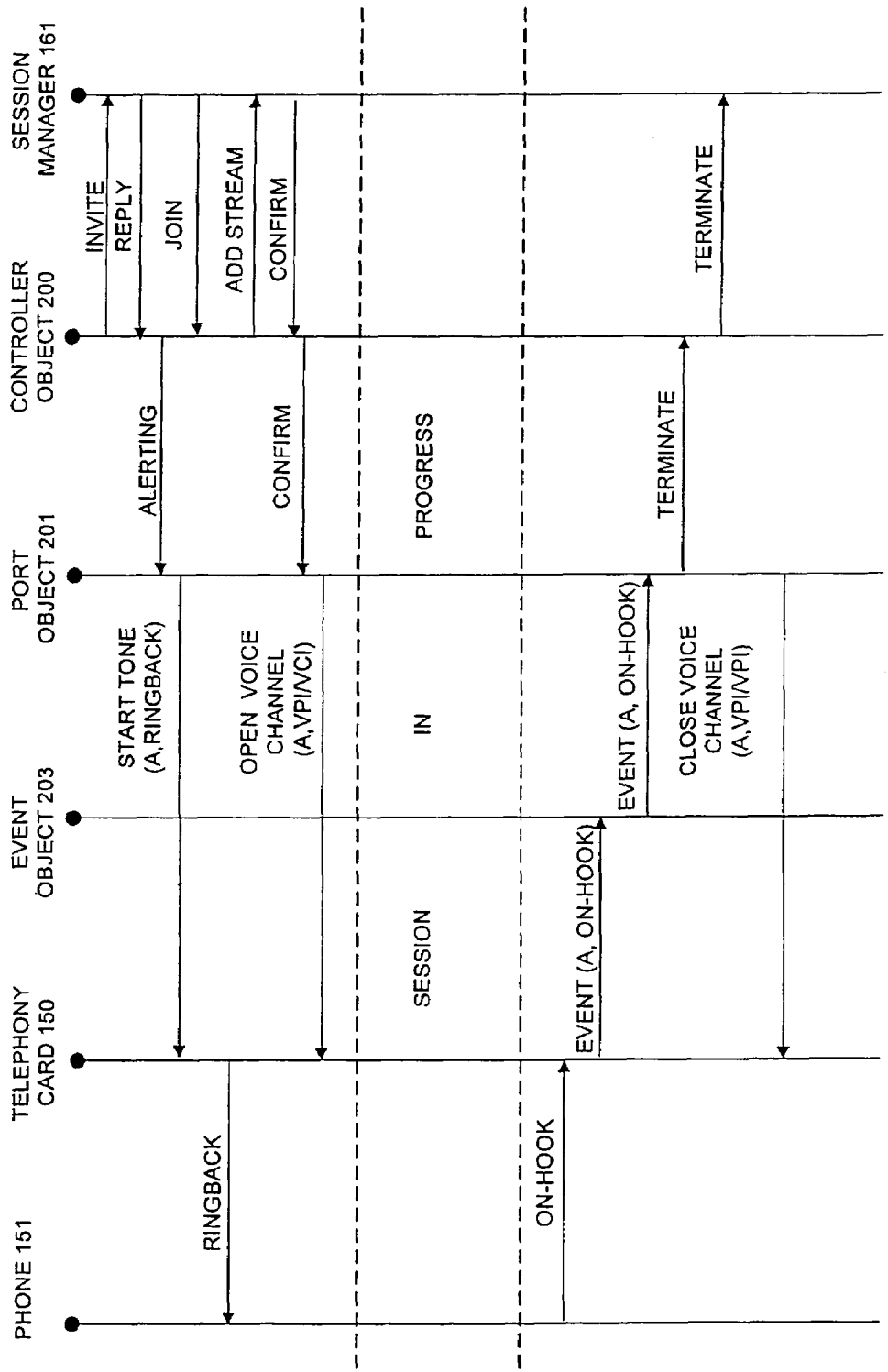
Figure 6:
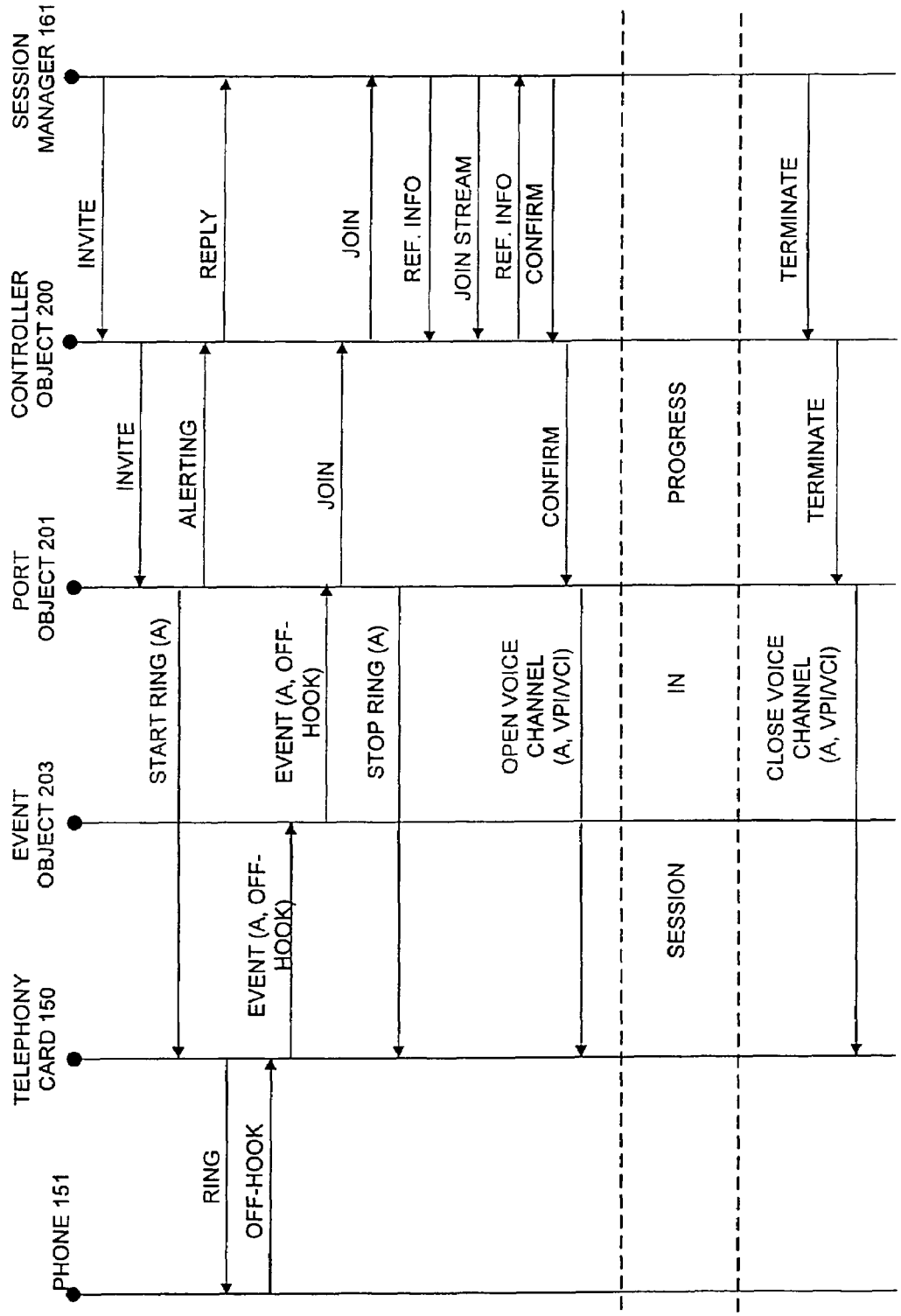

System Operation-FIGS. 4-6

FIGS. 4-6 depict a message sequence chart for operative examples of the invention, but the invention is not restricted to these examples. FIGS. 4 and 5 depict a call that originates and terminates at the phone 151. On FIG. 4, the port object 201 sends "wait event (A, off-hook)" to the telephony card 150. When the user places a call by taking the phone 151 off-hook, the telephony card 150 detects the off-hook event and transmits "event (A, off-hook)" to the event object 203. Messages between the telephony card 150 and the event object 203 or the port object 201 utilize the API 110. The event object 203 provides an off-hook indication to the port object 201. The port object 201 moves from the idle state to the dial tone state and responds to the telephony card 150 with the messages "start tone (A, dial)" and "wait event (A, digit)". The port object 201 also generates an instance of a digit collection object to process subsequently collected digits.

The user inputs a called number using the telephone 151. The telephony card 150 detects the digits and forwards the values to the event object 203. For a called number of 1-800-555-2222, the messages "event (A, digit, 1)" and "event (A, digit, 8)" would be used for the first two dialed digits, and the message "event (A, digit, 2)" would be used for the last dialed digit. The event object 203 provides a digit indication to the port object 201. After the first digit, the port object 201 moves from the dial tone state to the digits state and sends "stop tone (A, dial)" to the telephony card 150. In response, the telephony card 150 stops the dial tone on channel A. The port object 201 also processes the digit values with the digit collection object.

The digit collection object determines that the formatting of the called number is correct and that digit collection is complete. The digit collection object indicates to the port object 201 that digit collection is complete and provides the called number. In response to the digits complete message, the port object 201 moves from the digits state to the call proceeding state and indicates a request for telephony service with the dialed number to the controller object 200.

The controller object 200 generates and transmits a Start Service message requesting telephony service to the session manager 161. The session manager responds with reference information such as the session ID, the party ID, and a secret ID. On FIG. 5, the controller object 200 generates and transmits an invite message with the dialed number to the session manager 161. The session manager 161 typically sets-up the session and returns a reply message to the controller object 200 indicating that the called party is being alerted. Alternatively, the called party might be busy or might reject the session.

If an alerting indication is received in the reply message, the controller object 200 indicates the alerting condition to the port object 201, and the port object moves to the ringback state. The port object 201 sends "start tone" (A, ringback) to the telephony card 150. In response, the telephony card 150 puts a ringback tone on channel A to emulate a ringing phone at the far end.

When the party at the far end accepts the invitation, the session manager 161 sends a Join message to the controller object 200. In response, the controller object 200 generates and transmits an add stream message to the session manager 161 with the terminal ID, the party ID, and the VPI/VCI. The session manager 161 sends a Confirm message to the controller object 200 and the controller object 200 sends a confirm indication to the port object 201. In response to the confirm indication, the port object 201 sends "open voice channel (A,VPI/VCI)" to the telephony card 150. In response to the open voice channel message, the telephony card 150 stops the ringback tone and interworks the analog telephony signal on channel A with the ATM signal on the VPI/VCI. At this point, the session is in progress and the telephone call can proceed.

The session ends when the user places the phone 151 on-hook. The telephony card 150 sends "event (A, on-hook)" to the event object 203 which indicates the on-hook to the port object 201. The port object 201 indicates the termination status to the controller object 200 and sends "close voice channel (A, VPI/VCI)" to the telephony card 150. The telephony card 150 ceases to interwork channel A with the VPI/VCI. The controller object 200 generates and transmits a Terminate message to the session manager 161.

FIG. 6 depicts a call that is placed to the phone 151 by another party and that is terminated by the other party. The controller object 200 first receives an Invite message with a session ID and dialed number from the session manager 161. The controller object 200, based on its call-handling policy, determines which phone to route the call to. In this example, the call is routed to channel A. The controller object 200 indicates the invitation to the port object 201, and the port object 201 sends "start ring (A)" to the telephony card 150. The telephony card begins to ring the phone 151. The controller object 200 sends a reply message back to the session manager 161 indicating that the user is being alerted. In the alternative, the reply message sent to the session manager 161 could indicate that the phone 151 was busy or that the session was rejected.

When the user takes the phone 151 off-hook to answer the call, the telephony card 150 sends "event (A, off-hook)" to the event object 203 which indicates the off-hook to the port object 201. The port object 201 sends "stop ring (A)" to the telephony card 150 which stops the ringing. The port object 201 informs the controller object 200 that the user has joined the session and the controller object 200 sends a join message to the session manager 161.

The session manager 161 sends reference information to the controller object 200 indicating the session ID, party ID, and secret ID. The session manager 161 also sends a Join Stream message to the controller object 200. In response, the controller object 200 generates and transmits reference information to the session manager 161 with the terminal ID, the party ID, and the VPI/VCI. The session manager 161 sends a Confirm message to the controller object 200 and the controller object 200 sends a confirm indication to the port object 201. In response to the confirm indication, the port object 201 sends "open voice channel (A,VPI/VCI)" to the telephony card. At this point, the session manager 161 has the information to set-up the connection. Subsequently, the session is in progress and the telephone call can proceed.

The session ends when a termination message is received by the controller object 200 from the session manager 161. The controller object 200 indicates the termination status to the port object 201 which sends "close voice channel (A, VPI/VCI)" to the telephony card 150. The telephony card 150 ceases to interwork channel A with the VPI/VCI.

It should be appreciated that various combinations of call origination and termination can occur in the context of the invention. For example the phone 151 can originate a call or receive a call. Likewise, the phone 151 can terminate a call or the called party can terminate a call. It should also be appreciated that the port object 202 and the event object 204 operate in a similar fashion to the port object 201 and the event object 203 respectively. Using these objects, the provider agent can handle multiple sessions at the same time. A provider agent can have numerous such objects, but only two groups are shown for purposes of clarity.

Race conditions exist when improper events occur given the current state of the port objects 151-152. This typically occurs when calls are incoming and outgoing at the same moment. One example is where an invite message is received by the controller object 200, and the controller object 200 determines that the status of channel A is idle, but in reality, the port object 201 is already in the dial tone state due to an off-hook event. The port object 201 will receive an invite indication from the controller object 200 when it expects to receive digit indications from the event object 203. In this case, the port object 201 must instruct the controller object 200 to reply busy or reject, and to set channel A status to busy.

In another example, the controller object 200 may receive an invite message from the session manger 161, but before the phone 151 rings, the phone 151 goes off-hook. The port object 201 will receive an invite indication from the controller object 200 and an off-hook event from the telephony card 150. In this case, the port object 201 instructs the telephony card 150 to open the voice channel and VPI/VCI for the incoming call as if the phone was answered for that call.

Figure 7:
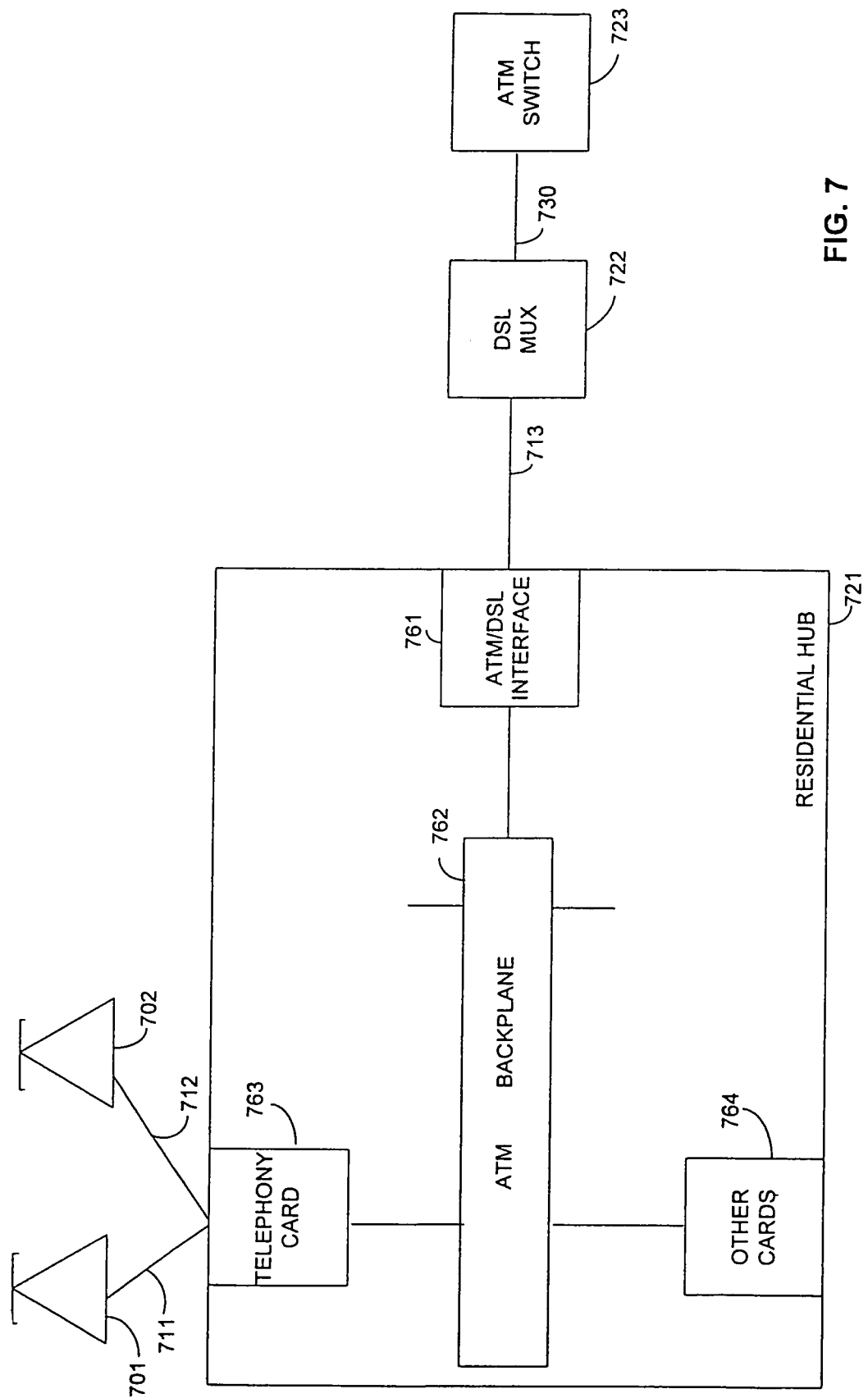
FIG. 7 is a block diagram of a residential hub for some examples of the invention.

The Residential Hub-FIG. 7

FIG. 7 depicts an example of the residential hub 721 in some embodiments of the invention, but variations in the residential hub 721 are contemplated by the invention. Conventional requirements for the residential hub 721 can be found in Telecommunications Industry Association (TIA) document SP-3771. The telephones 701 and 702 are connected to the residential hub 721 by connections 711 and 712 respectively. The residential hub 721 is connected to the DSL mux 722 by connection 713. The DSL mux 722 is connected to the ATM switch 723 by connection 730.

The telephones 701 and 702 are conventional communications devices that use the analog telephony format. The connections 711 and 712 are any medium operational to carry analog telephony signals, and the connections 711 and 712 are typically twisted pairs of copper wires. The connection 713 is also capable of carrying signals using the ATM/DSL format. The ATM/DSL format is a DSL signal that transports ATM cells as the high-bandwidth data.

The residential hub 721 is located at a residence. A residence is a conventional dwelling where people reside, such as a house, duplex, apartment, or condominium. The residential hub 721 provides an analog telephony interface to the telephones 701 and 702. The residential hub 721 provides an ATM/DSL interface to the DSL mux 722. The residential hub 721 executes provider agent software that directs system operation.

The DSL mux 722 is a device that interworks the ATM/ADSL format with an ATM/broadband format. The ATM/broadband format is a broadband signal that transports ATM cells. Synchronous Optical Network (SONET) is a popular broadband format, and the ATM/SONET format is well known. Preferably, the DSL mux 722 includes redundant OC-3 network interfaces and handles up to 255 residences on the access side. The DSL mux 722 should be able to differentiate data from voice. In some embodiments, the DSL mux 722 could be adapted to provide Switched Virtual Circuits (SVCs) to the ATM switches 723. The DSL mux 722 could be adapted from the DSL product provided by Westell.

The ATM switch 723 is able to establish SVCs and Permanent Virtual Circuits (PVCs). The ATM switch 723 is conventional such as the Vector switch supplied by Nortel. The connection 730 carries the ATM/broadband format. In some embodiments the connection 730 carries the ATM/SONET format. For example, the connection 730 could be comprised at least in part of a Broadband Metropolitan Area Network (BMAN) that uses a 4-fiber, bi-directional, line switched, self-healing, OC-3 SONET ring.

There are various ATM connectivity options between the ATM switch 723 and the residential hub 721. ATM connections could be provisioned as PVCs from the residential hub 721 directly to the ATM switch 723. PVCs tend to waste bandwidth in the SONET rings comprising the connection 730. ATM connections could be provisioned from the residential hub 721 to the DSL mux 722, and the DSL mux 722 and the ATM switch 723 could establish SVCs to communicate. The entire connection between the residential hub 721 could be established with SVCs as needed. Combinations of PVCs and SVCs could also be used. For example, low bandwidth control channels could be provisioned directly from the residential hub 721 to the ATM switch 723, but higher bandwidth user channels could be established on an SVC basis.

The residential hub 721 includes an ATM/DSL interface 761, an ATM backplane 762, a telephony card 763, and other cards 764. The telephones 701 and 702 are connected to the telephony card 763 by connections 711 and 712. The ATM/DSL interface 761 is connected to the DSL mux 722 by connection 713. An uninterruptable power supply (UPS) may be included if desired in order to provide power during an outage to the residence.

The ATM/DSL interface 761 provides smoothing and shaping for the ATM signals. The ADSL/ATM interface 761 converts control and communications ATM cells into the ATM/DSL format for transport to the DSL mux 722. The ATM/DSL interface 761 also receives control and communications ATM cells from the DSL mux 722 and provides these to the appropriate components of residential hub 721 using the ATM backplane 762. The ATM backplane 762 allows for ATM communications within the residential hub 721.

The telephony card 763 supports analog telephony communications with the telephones 701 and 702. The telephony card 763 is controlled by a provider agent that is resident in the residential hub 721. The telephony card 763 provides power and dial tone to the telephones. The telephony card 763 detects on-hook, off-hook, and DTMF tones. The telephony card 763 provides ringback and busy tones to the telephones 701 and 702. The telephony card 763 interworks analog telephony signals with ATM signals. In some embodiments, the telephony card 763 provides echo cancellation or other digital signal processing functions. The telephony card 763 could be adapted from the telephony card product supplied by Innomedia Logic of Quebec, Canada.

The other cards 764 represent a number of different cards that can be plugged into the residential hub. Empty slots for additional cards are also shown on the ATM backplane. Some examples of other cards 764 include a Java card, ATM card, MPEG card, utility card, or LAN card. The cards provide communications services to the end users as discussed below.

The Java card includes a processor and memory and is operational to receive Java applets from the service node. Java applets can support a wide variety of tasks. In particular, Java applets can be used to provide the intelligence to support class 5 features, such as call waiting and call forwarding. The Java card also exerts control over the cards and DSL/ATM interface 761. This could include ATM virtual connection assignments for communications to the mux or a service node. The Java card may also communicate with the service node to request numerous other communications services. The ATM card provides an ATM interface to devices within the residence. If the ATM card exchanges ATM signaling with resident devices over VPI=0 and VPI=5, then the ATM card may use virtual path associated signaling to exchange control information with the service node. The MPEG card provides an MPEG interface to devices within the residence. MPEG is a video formatting standard. Typically, the MPEG card will receive MPEG formatted video in ATM cells through the ATM/DSL interface 761 and provide video signals to devices in the residence. The utility card is coupled to utility metering devices in the home. The utility card is programmed to collect the metering information and forward it to the utility companies through ATM/DSL interface 761. The LAN card supports a LAN that is internal to the residence. For, example, the LAN card could support ethernet connections to multiple computers. The computers could access the Internet through the LAN card and ATM/DSL interface 761.

The invention is not restricted to basic telephone service. A subscription/configuration service could also be deployed. The provider agent would analyze the called number to determine if telephone service or the subscription/configuration service is requested. The provider agent would then direct the telephony card to couple the call to the requested service. Other services could be implemented in a similar fashion.

Those skilled in the art can appreciate variations of the above-described embodiments that fall within the scope of the invention. As a result, the invention is not limited to the specific embodiments discussed above, but only by the following claims and their equivalents.

What is claimed is:

1. A method of operating a communication device for a communication session wherein the communication device includes at least two ports respectively coupled to at least two analog telephones and wherein the communication device is coupled to a packet network, the method comprising:

receiving a first message from the packet network indicating a called number and responsively processing the called number to select one of the ports coupled to one of the analog telephones and to transfer a ring signal through the selected port to ring the one analog telephone;

transferring a second message to the packet network indicating that a called party associated with the called number is being alerted responsive to transferring the ring signal;

detecting an off-hook condition for the one analog telephone and responsively stopping the transfer of the ring signal;

transferring a third message to the packet network indicating packet routing information for the communication session;

exchanging analog voice signals with the one analog telephone through the selected port and exchanging voice packets with the packet network using the packet routing information; and interworking between the analog voice signals and the voice packets.

2. The method of claim 1 further comprising detecting an on-hook condition for the analog telephone and responsively transferring a fourth message indicating termination of the communication session.

3. The method of claim 1 wherein the packet network comprises internet protocol systems.

4. The method of claim 1 wherein the packet network comprises asynchronous transfer mode systems.

5. The method of claim 1 wherein receiving the first message from the packet network comprises receiving the first message over an internet protocol connection.

6. The method of claim 1 wherein receiving the first message from the packet network comprises receiving an invite message from the packet network.

7. The method of claim 1 wherein exchanging the voice packets with the packet network comprises exchanging the voice packets with the packet network over a Digital Subscriber Line link.

8. The method of claim 1 further comprising storing rules for selecting the one telephone based on the called number.

9. The method of claim 1 further comprising storing voice mail rules.

10. The method of claim 1 further comprising storing call blocking rules.

11. A communication device for a communication session wherein the communication device is coupled to a packet network, the communication device comprising:

circuitry that includes at least two ports configured to respectively couple to at least two analog telephones wherein the circuitry is configured to receive a first message from the packet network indicating a called number, transfer a ring signal through a selected one of the ports to one of the analog telephones to ring the one analog telephone, transfer a second message to the packet network indicating that a called party associated with the called number is being alerted, detect an off-hook condition for the one analog telephone, stop the transfer of the ring signal, transfer a third message to the packet network indicating packet routing information for the communication session, exchange analog voice signals with the one analog telephone through the selected port, exchange voice packets with the packet network using the packet routing information, and interwork between the analog voice signals and the voice packets; and a processor configured to process the called number to select the port coupled to the one analog telephone and to direct the circuitry to transfer the ring signal through the selected port and to transfer the second message, and wherein the processor is configured to direct the circuitry to stop the transfer of the ring signal and transfer the third message responsive to the off-hook condition, to direct the circuitry to exchange the analog voice signals with the one analog telephone through the selected port, and to direct the circuitry to interwork between the analog voice signals and the voice packets.

12. The communication device of claim 11 wherein:

the circuitry is configured to detect an on-hook condition for the analog telephone and transfer a fourth message indicating termination of the communication session; and the processor is configured to direct the circuitry to transfer the fourth message in response to the on-hook condition.

13. The communication device of claim 11 wherein the packet network comprises internet protocol systems.

14. The communication device of claim 11 wherein the packet network comprises asynchronous transfer mode systems.

15. The communication device of claim 11 wherein the circuitry is configured to receive the first message from the packet network over an internet protocol connection.

16. The communication device of claim 11 wherein the first message comprises an invite message.

17. The communication device of claim 11 wherein the circuitry is configured to exchange the voice packets with the packet network over a Digital Subscriber Line link.

18. The communication device of claim 11 wherein the processor executes rules for selecting the one telephone based on the called number.

19. The communication device of claim 11 wherein the rules include voice mail rules.

20. The communication device of claim 11 wherein the rules include call blocking rules.

* * * * *